(12) United States Patent
Kleven et al.

(10) Patent No.: US 10,013,813 B2
(45) Date of Patent: Jul. 3, 2018

(54) SYSTEM AND METHOD FOR AUTOMATIC REGISTRATION OF USE OF STUDDED TIRES

(71) Applicant: Ares Turbine AS, Gol (NO)

(72) Inventors: Ole Bjøn Kleven, Geilo (NO); Fredrik Nerol Kleven, Ås (NO)

(73) Assignee: ARES TURBINE AS, Gol (NO)

( * ) Notice: Subject to any disclaimer, the term of this patent is extended or adjusted under 35 U.S.C. 154(b) by 905 days.

(21) Appl. No.: 14/372,784

(22) PCT Filed: Jan. 23, 2013

(86) PCT No.: PCT/NO2013/050017
§ 371 (c)(1),
(2) Date: Jul. 17, 2014

(87) PCT Pub. No.: WO2013/112057
PCT Pub. Date: Aug. 1, 2013

(65) Prior Publication Data
US 2015/0025945 A1    Jan. 22, 2015

(30) Foreign Application Priority Data
Jan. 23, 2012   (NO) .................................. 20120069

(51) Int. Cl.
*G01M 17/02*        (2006.01)
*G07B 15/00*        (2011.01)
(Continued)

(52) U.S. Cl.
CPC .............. *G07B 15/00* (2013.01); *E01F 11/00* (2013.01); *G01G 3/16* (2013.01); *G01G 19/024* (2013.01);
(Continued)

(58) Field of Classification Search
None
See application file for complete search history.

(56) References Cited

U.S. PATENT DOCUMENTS 3,835,449 A    9/1974   Viracola
4,789,941 A    12/1988  Nunberg
(Continued)

FOREIGN PATENT DOCUMENTS

DE   197 44 076   4/1999
EP   2216659      8/2010
(Continued)

OTHER PUBLICATIONS

Schumacher T. et al: "Detection of Vehicle with Studded Tires Using Acoustic Emission Sensors Mounted to Highway Bridges" in: Journal of Transportation Engineering, 2010. May, vol. 136, No. 5, pp. 480-487, ISSN 0733947X.
(Continued)

*Primary Examiner* — Brent Swarthout
(74) *Attorney, Agent, or Firm* — Cozen O'Connor

(57) ABSTRACT

This publication describes a method and a system for registering use of studded decks (6) and for collecting due toll for use of studded decks on a vehicle (19) having at least one studded deck (6). This is done when a vehicle (19) passes over a detection device (1) on a road surface (18) of a road, the detection device (1) being associated with one or more sensors (2) that is able to detect impulses created by the decks (6) on the vehicle (19) that passes over the detection device (1). The impulses are registered and compared with a pre-determined value that enables a processing device (3) to determine whether one or more of the decks (6) are provided with studs or not. The system is configured in
(Continued)

such way that the processed signal provides basis for collecting toll or at least bringing this fact to the attention of the driver and that toll is due.

17 Claims, 8 Drawing Sheets

(51) Int. Cl.
| | | |
|---|---|---|
| *E01F 11/00* | (2006.01) | |
| *G06Q 10/06* | (2012.01) | |
| *G08G 1/017* | (2006.01) | |
| *G08G 1/04* | (2006.01) | |
| *G01G 3/16* | (2006.01) | |
| *G01G 19/02* | (2006.01) | |

(52) U.S. Cl.
CPC ............ *G06Q 10/06* (2013.01); *G08G 1/017* (2013.01); *G08G 1/04* (2013.01); *G01M 17/02* (2013.01)

(56) References Cited

U.S. PATENT DOCUMENTS

| | | | |
|---|---|---|---|
| 6,137,424 A | 10/2000 | Cohen et al. | |
| 6,343,506 B1 | 2/2002 | Jones et al. | |
| 7,797,995 B2 | 9/2010 | Schäfer | |
| 2002/0105440 A1* | 8/2002 | Bostrom | G07B 15/063 |
| | | | 340/928 |
| 2002/0126023 A1* | 9/2002 | Awada | G08G 1/096716 |
| | | | 340/905 |
| 2003/0201909 A1 | 10/2003 | Hilliard | |
| 2004/0154715 A1 | 8/2004 | Dufournier | |
| 2004/0164749 A1 | 8/2004 | Dingwall et al. | |
| 2005/0192727 A1 | 9/2005 | Shostak et al. | |
| 2006/0002589 A1 | 1/2006 | Colmenarez et al. | |
| 2006/0037400 A1 | 2/2006 | Haynes et al. | |
| 2006/0060279 A1 | 3/2006 | Jansson et al. | |
| 2006/0074546 A1* | 4/2006 | DeKock | G08G 1/01 |
| | | | 701/117 |
| 2006/0156802 A1 | 7/2006 | Cohen | |
| 2007/0008179 A1* | 1/2007 | Hedley | G07B 15/06 |
| | | | 340/928 |
| 2008/0209995 A1* | 9/2008 | Taylor | G01L 17/005 |
| | | | 73/146 |
| 2009/0174575 A1 | 7/2009 | Allen et al. | |
| 2010/0245126 A1* | 9/2010 | Kohli | G07B 15/063 |
| | | | 340/928 |

FOREIGN PATENT DOCUMENTS

| | | |
|---|---|---|
| JP | 05-174293 | 7/1993 |
| JP | 2000 346755 | 12/2000 |
| JP | 2009-230599 | 10/2009 |

OTHER PUBLICATIONS

Shahina Kozhisseri et al: "Special Features for the Classification of Civilian Vehicles using Acoustic Sensor" in 2009 IEEE Workshop on Computational Intelligence in Vehicles and Vehicular Systems, Mar. 30, 2009, Conference Proceedings, Article No. 4938729, pp. 93-100, ISBN 142442770-3.

Schumacher, "Memo: Monitoring of Road Vehicles in-use. Results from Testing of Measurement Equipment", Jan. 4, 2008, 22 pages.

Schumacher, T. et al. Detection of Vehicles with Studded Tires Using Acoustic Emission Sensors Mounted to Highway Bridges in Journal of Transportation Engineering, May 2010, vol. 136, pp. 480-487.

\* cited by examiner

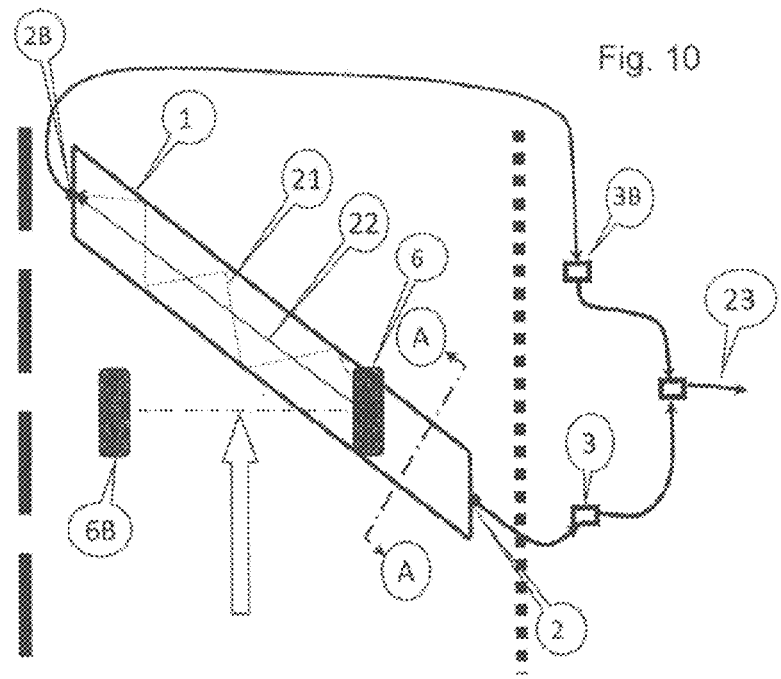
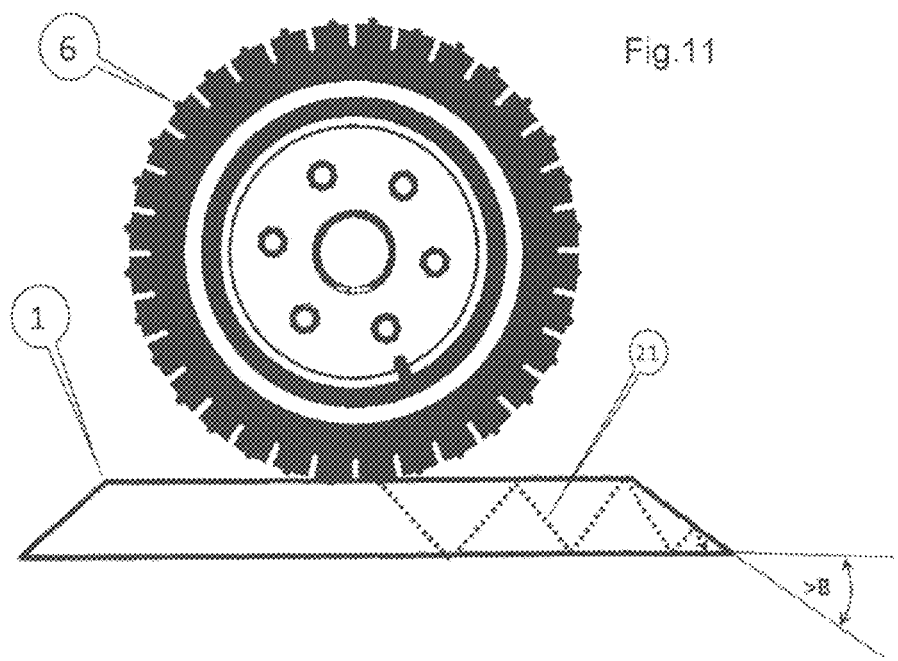

SYSTEM AND METHOD FOR AUTOMATIC REGISTRATION OF USE OF STUDDED TIRES

CROSS-REFERENCE TO RELATED APPLICATIONS

This application is a U.S. National Phase Application under 35 U.S.C. 371 of International Application No. PCT/NO2013/050017, filed on Jan. 23, 2013, which published as WO 2013/112057 A1 on Aug. 1, 2013, which claims priority from Norwegian Application No. 20120069, filed Jan. 23, 2012, all of which are herein incorporated by reference.

TECHNICAL FIELD OF THE INVENTION

The present relates to a method and a system for detection and registration of the velocity, weight and use of studded tires of a vehicle, including use of studded tires, and for collecting required toll for such vehicles and/or to monitor and/or register the traffic or the tire conditions of vehicles on road or motorway.

BACKGROUND FOR THE INVENTION

More or more transport of goods is transported by means of very long trailers or vehicles on the road system. This causes more and more wear and strain on the road system. In addition this may cause that trailers or long vehicles with too heavy load for the road system are driving on the road system, which generally is not desirable, but may be detrimental in periods where the frozen ground is about to thaw. The conventional way for weighing the vehicles with load is to take the vehicle into a side lane and weigh each pair of wheels on a common axle separately on a weighing cell. This may result in that the very long vehicles must repeat the weighing process three to four times each time, dependent on the number of pair of wheels on the vehicle in question.

Moreover, it is experienced that the tire standard on such vehicles often is not good enough. In Scandinavia, it is for example often experienced that trucks and long vehicles are driving around with very worn-down tires only suited for use during the summer season, thus constituting a large hazard and risk for personnel injury and material damages, while at the same time that roads may be blocked for long periods.

Use of studded tires is an established and well known method for increasing the road grip of the tires on icy and snow covered surfaces. The method has undoubtedly a positive effect on the gripping properties as well as possibilities for passage. The use provides also undisputable advantages with respect to a traffic safety point of view.

It is also a fact that studded tires wear down the road surface more than tires without studs. This wear produces local air pollution in the form of air suspended particulate matter in the form of very fine particles and in addition increased maintenance costs. Due to this fact undertakings have been introduced, such undertakings being introduction of toll on use of studded tires. In order to document due payment of such studded tire toll, season ticket is issued or as an alternative a one-day ticket may be bought. The ticket must be visually placed on the dashboard or fixed to the front window. The purpose of this studded tire toll is in principle serving as a compensation for the detrimental effects caused by the use of studded tires. In order to reduce the detrimental effects, it has also been proposed to introduce restrictions in use of studded tires during certain period in spite of the legitimacy of such use. Use of studded tires outside the allowable window for use of studded tires or during periods will result in a fine due for each wheel with studded tire, if and when such use is discovered or observed.

To-day, the toll is collected by means of a payment of a seasonal fee, payment machines or by payment using cell phones. Analyses have shown that a very large number (10-40%) do not pay the studded tire toll. This may be due to several reasons. The risk of being spotted is low, since the traffic wardens must perform manual checking for each single vehicle when in a parked position. Since several payment alternatives are available, the warden must perform an additional manual check whether the vehicle is provided with studded tires and if there is a ticket duly placed in a visual manner in the front window. This may quite often be problematic, since the front window during winter periods when studded tires are used, often is covered by snow or ice. In addition the traffic warden must also manually check the registration number of the vehicle against a central register to identify whether the owner has duly paid the toll in another acceptable way. Hence, it is very time consuming and not very effective way of controlling.

To-day it is common practice using vehicle identification systems for collecting the toll fee when the vehicle passes through a toll station, the passing of the vehicle being registered either by electronic registration, for example by radio frequency registration or by video filming, the registered information being communicated to a central unit processing the information, identifying the vehicle and registering the owner and sending a invoice for collection of the toll fee(s).

From tests it has been found that studded tires emit high frequency sound when the vehicle with studded tires drives along an asphalt or concrete covered traffic lane. Measurements of the frequencies of the sound, caused by the tires with and without studs, have been performed, and in particular for the high frequencies, i.e. frequencies higher than around 63 Hz, the differences are detectable. Moreover, measurements have shown that ice and snow cover do have an effect on the sound picture when measuring the noise caused by from tires.

Others have performed corresponding testing of studded tires, using acoustic sensors fixed directly to the road surface or on structures such as bridges. By this solution, it is the waves through air that are used for the measurements. This method functions, but is not suitable for detecting the various vehicles or their direction of motion. Moreover, snow and ice coverage on the road surface make the detection unreliable. Hence, it is therefor a need for obtaining a more reliable method for automatic measuring and registering use of studded tires on the vehicle, in order to secure that the user of studded tires do pay for the use of studded tires and for detecting whether a driver drive with studded tires outside the dedicated period.

Likewise, it is a need for providing a method and an apparatus which in a simple and effective way can measure the weight of the vehicle while moving. Likewise, it is a need for providing a method and an apparatus that more or less securely may provide signals detecting the conditions of the decks without having to stop the vehicle for visual detection while the vehicle has stopped.

SUMMARY OF THE INVENTION

The invention is based on the assessment based on tests that all decks produce its own unique characteristic sound picture, whether the deck being provided with studs or not.

The sound picture is materialized through a curve for each sensor, showing large peaks for studs, if studs are present and where also intermediate wavelets and/or deflection in amplitude indicate the pattern of the deck in transverse deck direction. Similarly, the difference between the start deflection for a deck passing and the residual oscillation that are present immediately after the passing of the deck, provide information about the weight/pressure imposed by the wheel on the supporting surface.

A main principle of the present invention is to use sound signals and sound impulses which are collected or generated by sensors associated with the road surface when the deck of a vehicle passes over the sensors, the sensors registering the sound signals with different frequencies and amplitudes, which by means separation, makes it possible to register the total weight, i.e. the weight of the vehicle itself and its payload, the vehicle velocity, the deck conditions and possible whether studs are present in the deck or not. The signals and/or the impulses which are generated when the decks pass over the sensors, will have different frequencies and amplitudes dependent of the deck condition, i.e. deck pattern, hardness and presence and density of studs in the deck, all monitored by the use of ultrasonic sound.

An element of the main principle according to the present invention resides in measuring the level of frequency and/or the amplitudes of the sound picture that is propagated in a registration surface integrated in the road surface, caused by the decks passing over the registration surface and to use the registered frequency measurements in order to identify weight, velocity, condition of the decks and type of decks used, for example if studs are present in the decks or not. If the vehicle is provided with studded decks, then possible fee or toll for use of studded decks shall be collected. Identifying sound pictures are measured when one or more decks are in physical contact with one or more sound transferring and/or sound amplifying surfaces, said surface(s) generates and sound transfers impulses through the material forming the surface(s) to a registration unit when said one or more deck pass over said one or more surfaces.

An object of the invention is to provide data in real time making it possible to monitor the traffic volume, type of deck used, the overall weight and the decks used on the vehicle.

Another object of the invention is to register a sound picture by passing in a manner making it more or less possible to disregard other types of noise related to road traffic and a vehicle, in order to establish the velocity, weight, type of deck and/or the deck conditions.

An object of the invention is to provide a method and a system making it possible to establish a picture of the condition and the quality of the decks on a vehicle, and/or to establish the weight without having to stop the vehicle for inspection of the wheels and/or weighing.

An object of the invention is to provide an improved method and an improved system for collecting in general the fees or taxes and fee for using studded decks in particular for those vehicles being equipped with such decks within the period where use of such studded decks are allowed.

Yet another object of the invention is to provide an automated method and system for identifying vehicles with studded decks outside the legal window for use of such decks, in order to issue and collect fines for such illegal violation of the provisions.

Another object of the invention is to provide a method and a system enabling a substantially more simplified fee, tax and fine collecting process, so that more of the collected money may be made available for maintenance and in such way that the pollutant pays for his pollution.

Yet another object of the invention is to provide a precise system for automatic registration of the conditions of the vehicle decks, weight, velocity and automatic registration, identifying whether the vehicle is provided with one or more studded decks during all of the possible weather conditions, and which distinguishes between vehicles with and without studded decks.

A still further object is to provide a method and a system which is more precise in identifying vehicles generally and whether the vehicle specifically is provided with one or more studded decks, so that erroneous collection of fees or fines is avoided or at substantially reduced.

Another object of the invention is to provide a system and a method where the collection of documentation may be done in real time and may be combined with registration of the passage of vehicles through a toll station.

The objects are achieved by a method and a system as disclosed in the independent claims, and where various embodiments, variants or alternative solutions are disclosed in the dependent claims.

According to the invention a method for collecting studded tire taxes or toll for a vehicle equipped with at least one studded tire is provided, where the vehicle is made to pass over a detecting device in a road surface, where the detector device is connected to one or more sensors which is configured to be able to detect impulses created by decks on a vehicle passing over the detector device and attached to the underside of a plate, for example made of metal, cement/concrete or a suitable composite material. The signals that are detected are then compared with predefined values enabling a processing device to decide whether one or more decks are provided with stud or not, whereupon the processing device processes a signal if one or more decks are identified being provided with studs. Moreover, the system is configured in such way that the processed signal provides basis for collection of a fee or toll.

In respect to the detection, also information is preferably collected, making it possible to identify the owner of the vehicle by means of video filming, radio frequency identification and/or photographing the number plate of the vehicle and making comparison with the owner register.

The processed information may preferably be used for issuing invoices for payment by the owner for the use of studded tires on the deck.

The processed information may be immediately sent to a device which visually informs the driver of the vehicle about the necessity of paying the fee or toll or the like.

The detection device is configured such that it is possible to identify which of the deck being equipped with studs.

The high frequency acoustic impulses created by one or more studded decks when passing over a metal plate which is integrated in the road surface, may be used for detecting use of studded decks, and that these impulses are collected by sensors that are configured to collect such impulses and produce real time signals for the further processing.

Moreover, according to the invention it is provided a system for collecting the studded deck fee or toll for vehicles equipped with at least one studded tire, where the detection device is arranged in connection with a road surface. Moreover, one or more sensors are arranged in association with the detection device for detecting impulses create by one or more decks on a vehicle passing over the detection device. A processing device compares impulses with a pre-determined profile for studded decks, and one or more devices for visualizing that studded tires are used.

The detection device comprises preferably a body, where the body is configured in such way that it provides high frequency waves through the material, caused by the studs of the deck, and where the high frequency waves are collected by said one or more sensors.

Moreover, the detection device may preferably form an integrated unit with the material that constitutes the road surface, said body preferably being made of at least one plate of a durable metal, such as steel, and which has excellent properties for propagating said impulses.

Said detection device may further extend across a road surface, preferably across the entire width of the road. The detection device forms preferably an angle which is different from 90 degrees with respect to the general direction of the road.

The system according to the invention may further comprise one or more imaging devices for depicting the vehicle when passing over the detection device and/or a device which identifies the number plate of the vehicle via a reading unit and/or a camera, receiving information from the processing device when the vehicle with studded tires passing and a device which issues an invoice to the owner of the vehicle when the criteria for studded tires are present.

The system may also comprise a device disclosing to a driver of a vehicle that the fee or toll for studded tires must be paid.

In particular, but not exclusively, the present invention is suitable for being connected with a system for registering passages through a toll station, where relevant data in any case shall be collected. Hence, an improved and simplified process for real time identification of the vehicle is provided. Alternatively, the method and the system may be arranged independent of such prior art systems. In such latter case it may be a need for a system which also simultaneously us registering the passing vehicle, either by radio tag or by video registration.

The sensor system that is used, may also be a free standing system that informs the driver that he is obliged to pay the fee or toll for studded tires, or that the legal window for using studded tires is closed.

The detector for sensing studded tires used, is of a type that is able to read the characteristic high frequency sound and amplitude which are produced when the metal studs in the decks hit a hard surface. Since it is a need for separating a particular vehicle from several vehicles, the sensors must be able to detect and select out one single vehicle at the time.

The present invention solves the problems related to detection of use of studded tires and collecting the fee or toll for such use of studded tires. Moreover, the system and the method will make it more difficult not to pay the required fee or toll.

The invention relates to a vehicle passing over a detector which is integrated in the road surface. This detector may for example only be positioned in connection with that part or that direction of the road where collection of a fee, for example the road into the city. The detector may be connected to a system which recognizes the number plate of the vehicle or registering an electronic tag.

Information from the studded deck detector and the device for vehicle identification may the for a data point of view be processed with the result obtain with respect to the responsible person owing the vehicle, securing that the responsible person is economically charged for the passing of a vehicle with studded tires.

To-day it is common practice to identify vehicles for recovery of toll money. The present invention may preferably be incorporated into such a system. The sensor system may also form an independent unit, giving the driver information that a fee for use of studded decks must be paid, or that the season for using studded tires has expired.

The studded deck sensor is also able to read the characteristic sound and amplitude created when the metal studs in the deck hit a hard surface. Since it is a need for differentiating the particular vehicle from other vehicles on the road, the sensor must be able to detect and single out one single vehicle at the time.

The detector described here may preferably have a width and a length making it possible to single out a vehicle from others. The detector may comprise a hard plate (for example of steel), which is integrated in the road surface in a manner that the vehicle has to pass over the detection device. The plate may preferably be acoustically connected to a microphone or an acoustic receiver. When the hard studs in the deck hit the plate a sound is produced, propagating through the plate to the acoustic receiver.

Experiments have shown that the sound picture of a studded deck differs clearly from a deck without studs. This sound picture may then be processed electronically and provides a signal that tells whether the vehicle has studded tires or not. The sound picture which is registered by use of the method and the system according to the invention gives also clear indications of weight, velocity and the condition of each deck. An essential advantage of the solution according to the present invention is in addition that it is possible to collect data related to and in real time of the vehicle in order to create an impression of the total weight, velocity or not the least the condition and status of the various decks while the vehicle still is in motion. In addition this makes it possible to communicate such information to the driver of the vehicle, linked up to information of the standard of the road surface, i.e. whether it is slippery or not and how advisable it will be for the driver to continue driving along the particular road in question, considering the deck standard and the properties of the road surface. This may be of vital importance, for example in connection with passage over mountain pass, hypothermic rain, etc.

SHORT DESCRIPTION OF THE DRAWINGS

Certain exemplary embodiments of the invention shall be described in more details below, referring to the drawings where:

FIG. 10 shows schematically an arrangement making it possible to detect the use of studded decks which in addition can measure the wheel distance, velocity and the width of the wheel base of a vehicle;

FIG. 11 shows schematically a view of a wheel equipped with studded deck, arranged on an embodiment of a detector, seen along the line A-A in FIG. 10;

DETAILED DESCRIPTION OF THE DRAWINGS

Although the detailed disclosure of an embodiment of the invention here refers to studded decks, its should be noted that also other relevant parameters may be registered and detected, such as the velocity of the vehicle, weight, distance between the wheels, use of twin wheels, and the conditions and standard of the decks. Such information and such data may be processed and used in the same processes, as described below in relation to detection and registration of studded deck related data.

Figure 1:
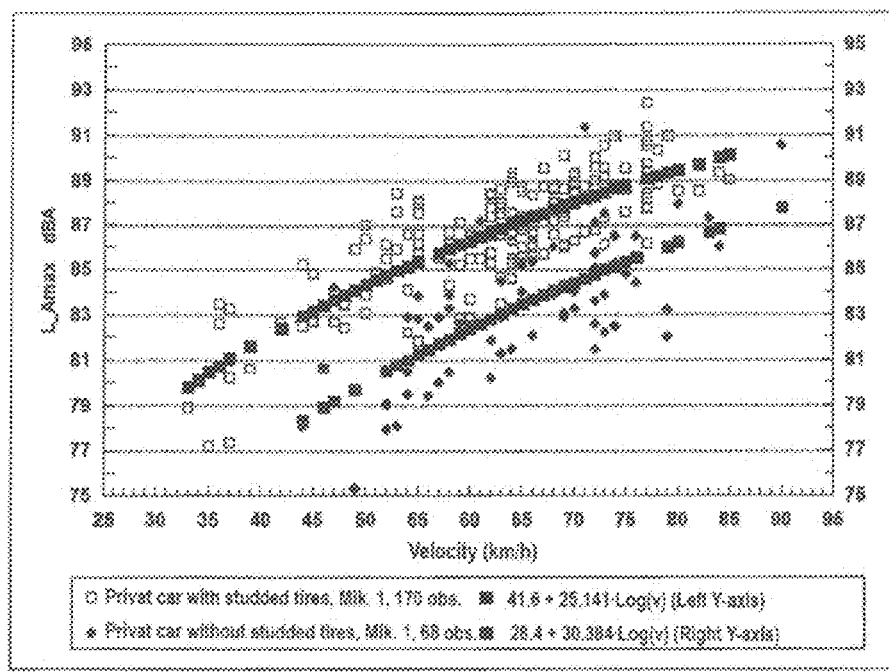
FIG. 1 shows acoustic measurements made, related to noise from studded tires, measured with a microphone through air.

FIG. 1 shows acoustic measurements made by SINTEF during measuring of noise from studded decks and ordinary decks, measured with microphone through air. The vertical axis shows the noise for a passage, measured in decibel (dBA) (L_$A_{maks}$ at 7.5 m distance, 1.2 m over the road surface), while the horizontal axis shows the velocity, measured in km/t for the range 30-90 km/t. The open squares represent a private car with studded decks, while the black diamond shaped points represents a private car without studded decks. As shown the average noise for the passing vehicles with studded decks is 3-5 dB(A) higher than the passing cars at a corresponding velocity without studded tires.

Figure 2:
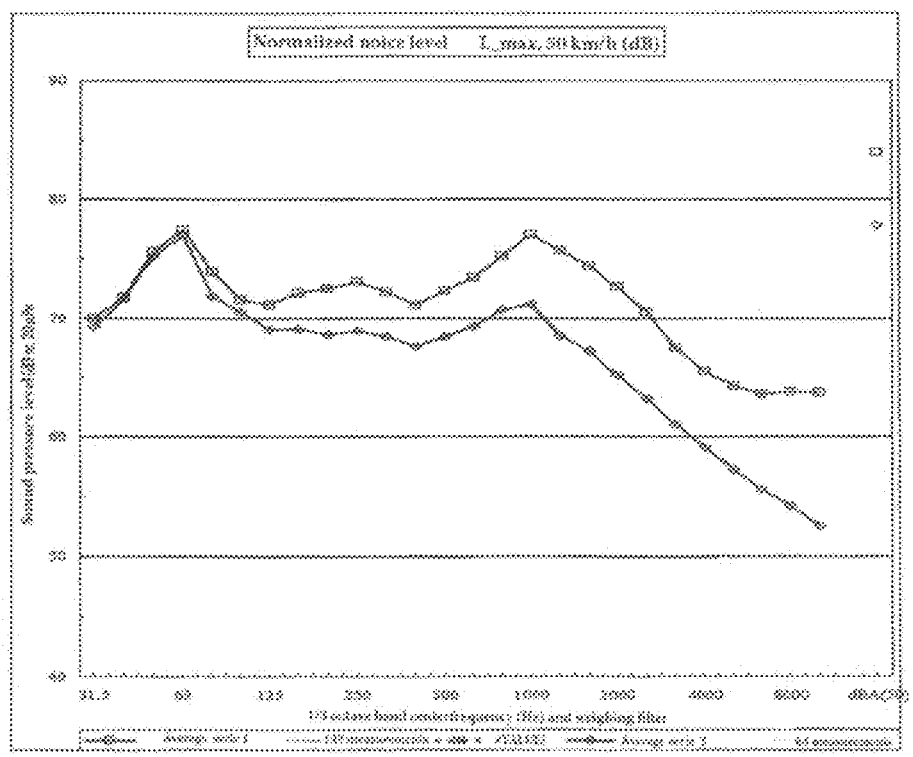
FIG. 2 shows the frequency specter for studded tires and for tires without studs, developed from tests made by SINTEF.

FIG. 2 shows the frequency spectrum for studded decks and for vehicles without such studded decks. Also these tests are made by SINTEF during a test. As shown in the Figure, for the high frequencies. i.e. over 63 Hz, the differences in frequency between decks with studs and decks without studs are large and large enough to be detected. Below 63 Hz the differences in frequency are more or less un-detectable. In relation to the present invention it is consequently the frequencies above 63 Hz that are forming the basis for detection of use of studded decks.

Figure 3:
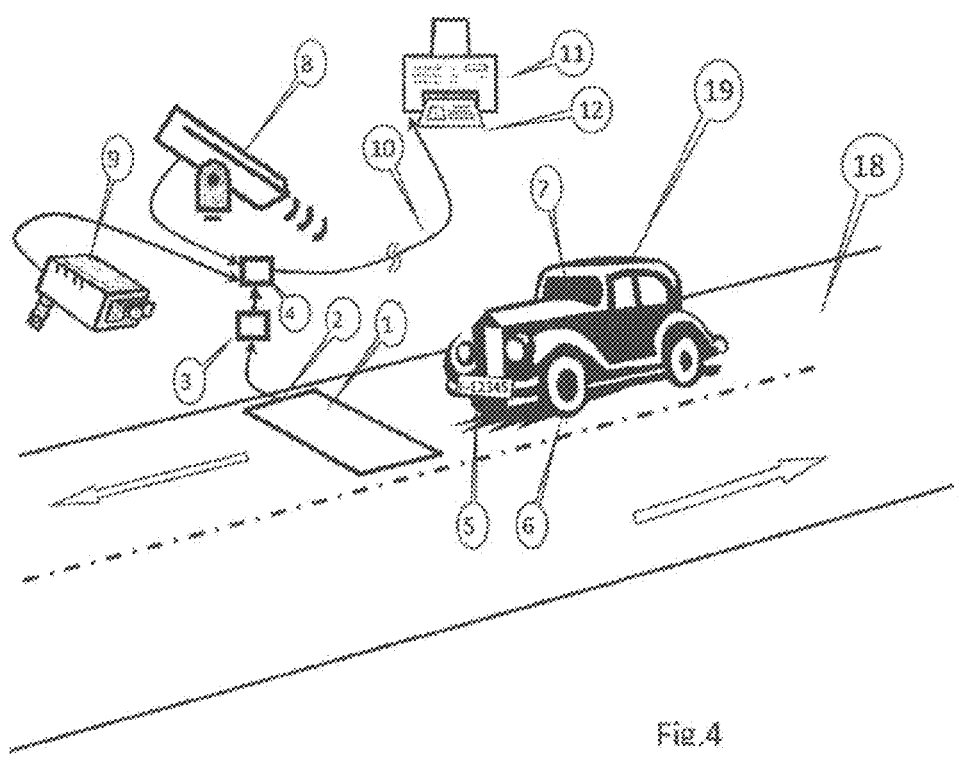
FIG. 3 shows schematically an embodiment showing a fully automated system for detection, individually reading and subsequent invoicing for the use of studded tires on a vehicle.

FIG. 3 shows schematically a fully automatic system for detection, individual reading and invoicing of vehicles 19. A detector plate 1 for detection of studded decks 6 is here integrated in a road surface of a road 18 where it is a desire to detect. When a wheel on the vehicle 19 passes over a detector plate 1, a signal is generated. Such signal is registered by one or more sensors 2. The signal or signals from said at least one sensor 2 becomes electronically processed by a processing unit 3, sending an electric signal which indicates whether a vehicle uses studded tires 6 or not. This signal from the processing unit 3 will then be combined with information related to the vehicle 19, either in that a camera 9 detects the registration number 5 of the vehicle, and/or that detection occur by means of a reading unit 8 which is reading the radio tag or an electronic tag. The tag may possibly be placed on the vehicle at a predetermined position. The information that here is collected related to the vehicle 19, is then combined with information from the studded deck sensor 3. This information is then sent electronically through a communication line 10 to a register 11, which contains information about the owner of the vehicle 19, and other information, such as paid season ticket for use of studded tires 6, etc. If desirable the register 11 issues automatically an invoice 12 to the owner of the vehicle for use of studded tire 6. Picture of the vehicle 19 from the camera 8 may also be stored in the register 11 as proof of the passage.

Figure 4:
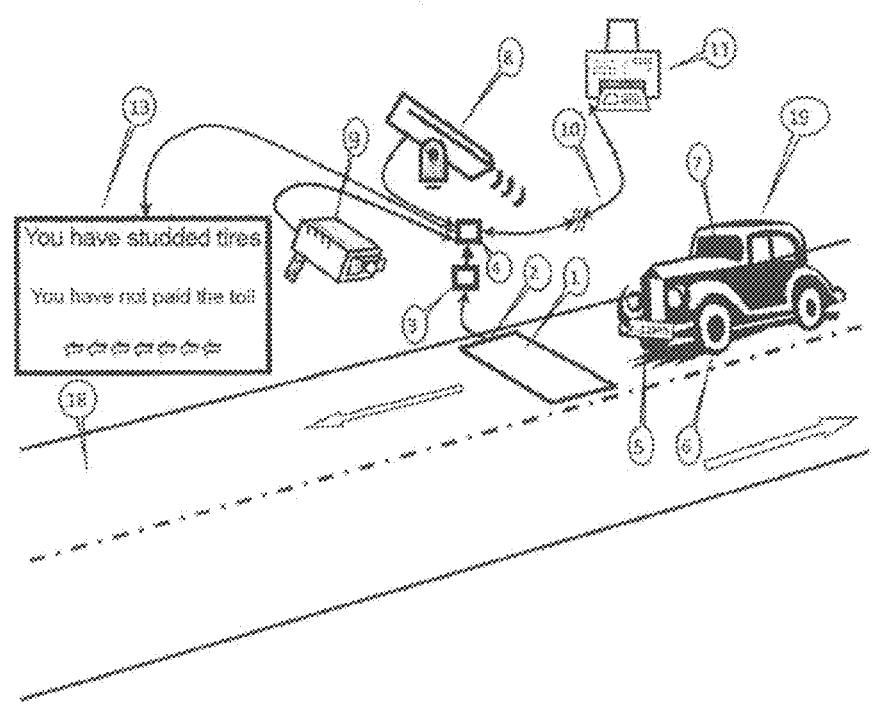
FIG. 4 shows schematically a semi-automated system for detection and individual reading of vehicles, with visual feed back to the driver with respect to the payment duty for the passage.

FIG. 4 shows a semi-automatic system for detection and individual reading of vehicle 19 with visual feedback via a visual feedback devises 13,20, such as a screen 13 or the like, to the driver in case payment is due for the passage. This saves cost related to invoicing. The detector plate 1 is here integrated in the road surface to be monitored. When the vehicle 19 passes the detector plate 1, the studded decks 6 generate high frequency waves which propagate through the plate 1 to a sensor 2, which produces a signal. This signal is electronically processed by a processing unit 3, which sends a signal which indicates whether studded tires 6 are used on the vehicle 19 or not. This signal is then combined with information related to the vehicle 19, either with a camera 9 that detects the registration number 5 of the vehicle 19, and/or detection is performed by means of a reader unit 8, that reads the radio tag 7 of the vehicle. The reading unit may possibly be placed on the vehicle 19. The information that is collected from the vehicle 19 is then combined with information from the studded deck sensor 3. This information is then sent via a communication channel 10 to a register 11 which contains information whether payment of toll is due for the vehicle or not. The register 11 sends information 10 back to a unit 4 which visually gives feedback 13 to the driver about the need for manual payment of the toll. Picture of the vehicle 19 from the camera 8 can also be stored in the register 11 as proof of the passage.

Figure 5:
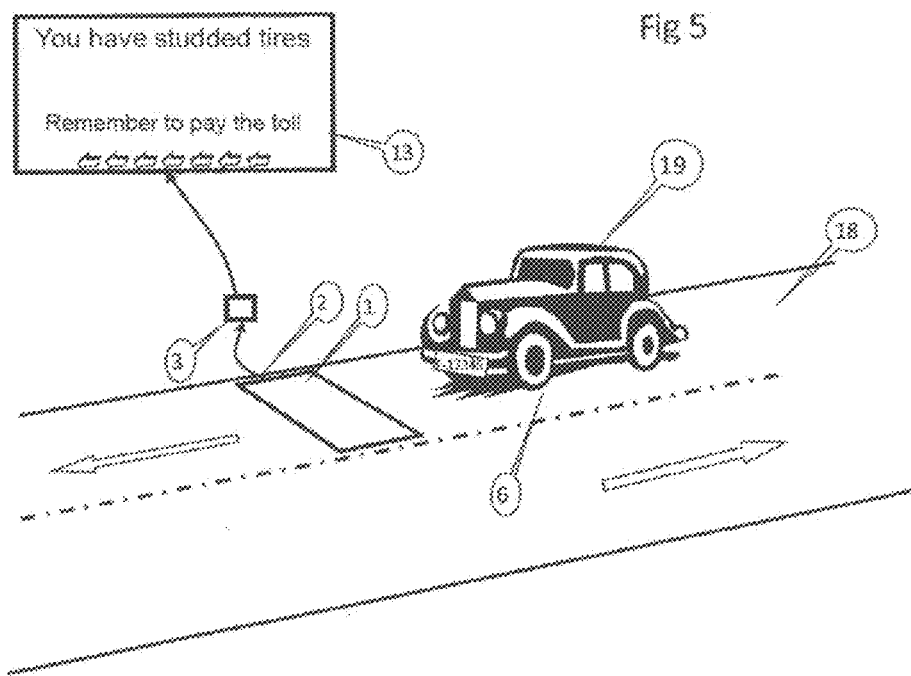
FIG. 5 shows schematically an information system for detection of vehicles, with visual feed back to the driver with respect to the duty to pay toll and with an invitation to pay such toll.

FIG. 5 shows an information system for detection whether a vehicle 19 is equipped with studded deck 6 or not. Moreover, the system is provided with a device 13 giving visual feedback to the driver that the vehicle 19 is equipped with studded decks, and with instructions to pay the toll due. This saves costs related to invoicing. The detector plate 1 is here integrated into the road surface of the road where detection is required. When the vehicle passes over the detector plate, high frequency waves are generated, the waves being registered by the sensor 2. Said waves are electronically processed by the unit 3 which sends a signal indicating whether the vehicle 19 is equipped with studded decks 6 or not. Information whether the vehicle 19 is equipped with studded decks 6 is visually displayed to the driver via a device 13, alternatively also with information of where and how due toll may be paid.

Figure 6:
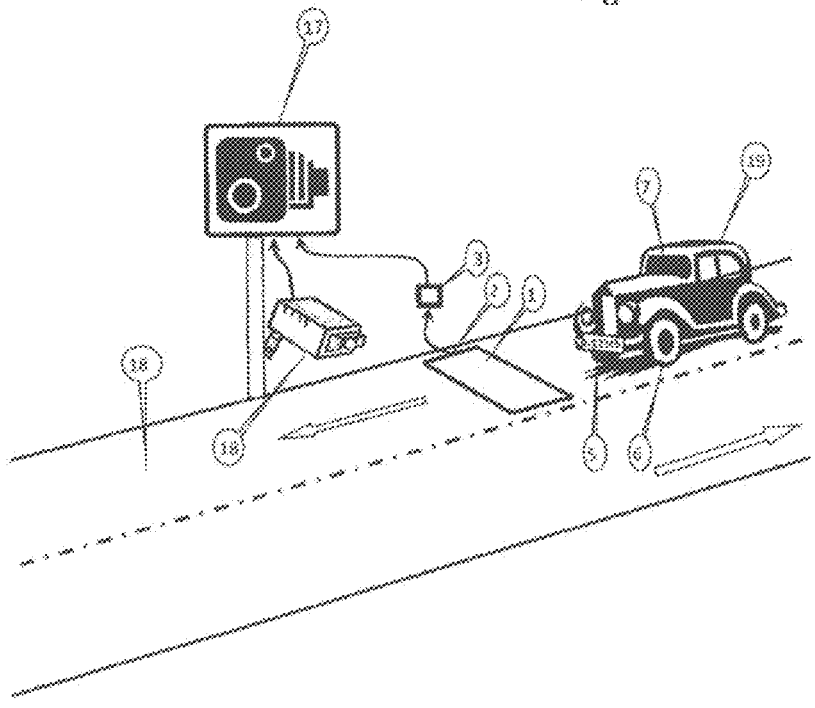
FIG. 6 shows schematically a photo registration system for detection and individual registration of the passage of the vehicle.

FIG. 6 shows a photo registration system for detection and individual reading of a vehicle 19. This solution is well suited for integration with existing photo boxes 17. The system is in particular suited for issuing toll or to fine vehicles that uses studded decks outside the legal period established for use of studded decks "the studded deck window". The detector plate 1 is here integrated with the road surface of the road 18 where it is intended to detect. When the vehicle 19 passes over the detector plate 1, this is read by a sensor 2. The signal from the sensor 2 is electronically processed by the unit 3 which send a signal indicating whether the vehicle 19 is equipped with studded decks 6, or not. This signal is then combined with the picture of the vehicle 19, the photo box with camera 17 images the number plate 5 of the vehicle 19. Information related to the vehicle 19 which now is collected, is then combined with information from the studded deck detector 3. This information is then processed along the same line as other data from the photo box 17. The picture of the vehicle 19 from the camera 17 may also be stored as evidence for the passage with studded decks 6, in particular preferably together with the image of the decks 6 of the vehicle 19, registered by the camera 18. This is possible to do during the season where the decks are not visually covered by snow, which usually is the case outside the "studded tire window".

Figure 7:
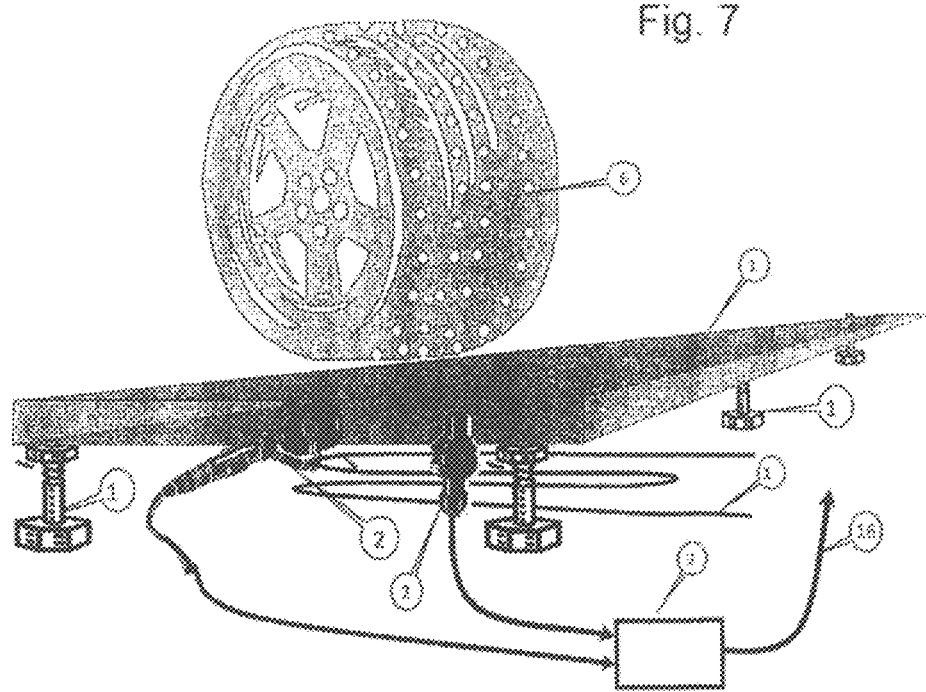
FIG. 7 shows schematically an embodiment of a studded tire detector and a studded deck passing over the sensor.

FIG. 7 shows an embodiment of the deck plate 1, the studded deck sensor 2 and a studded deck 6 which passes over the plate 1. A plate 1 is configured and positioned in the road surface 18 in a manner ensuring that an axis or a deck 6 passes over the plate 1, one at a time. This is necessary in order to select out the vehicle 19 in question from a number of adjacent vehicles. The detector plate 1 consists of a hard material (for example steel) which is integrated in the road surface in a way that enables the vehicle to pass over the detector plate. When the hard studs in the studded tire 6 hit the plate, the high frequency sound which is created, is propagated through the plate 1 to the acoustic receiver or sensor 2. The acoustic receiver 2 or the sensor may for example be a microphone 2 or a piezoelectric element 2 which is acoustically connected to the detector plate 1. The acoustic receiver 2 is able to register the characteristic sound that is created when the metal studs in the deck 6 hit the hard supporting surface. The signal from the acoustic receiver 2 is sent to a processing unit 3 which electronically analyses the signal, whereupon the processing unit 3 generates said signal 16, independent of the deck is equipped with studs or not. As described below, the signal produced by a studded deck 6 will differ substantially from a deck without studs, so that is possible to establish if the vehicle 19 is provided with studded decks 6 or not. The detector plate 1 may preferably be acoustically insulated from the road 18 and the surroundings, here disclosed with sound absorbing supporting legs 14. The acoustic insulation may for example also be obtained by embedding the detector plate 1 into a plastic/elastic material, such as rubber or asphalt.

Since the sound picture from the studded decks is affected by ice or snow cover on the detector plate 1, it is an advantage that the detector plate 1 is provided with a snow melting system, here shown with electrical heating cable 15.

Figure 7B:
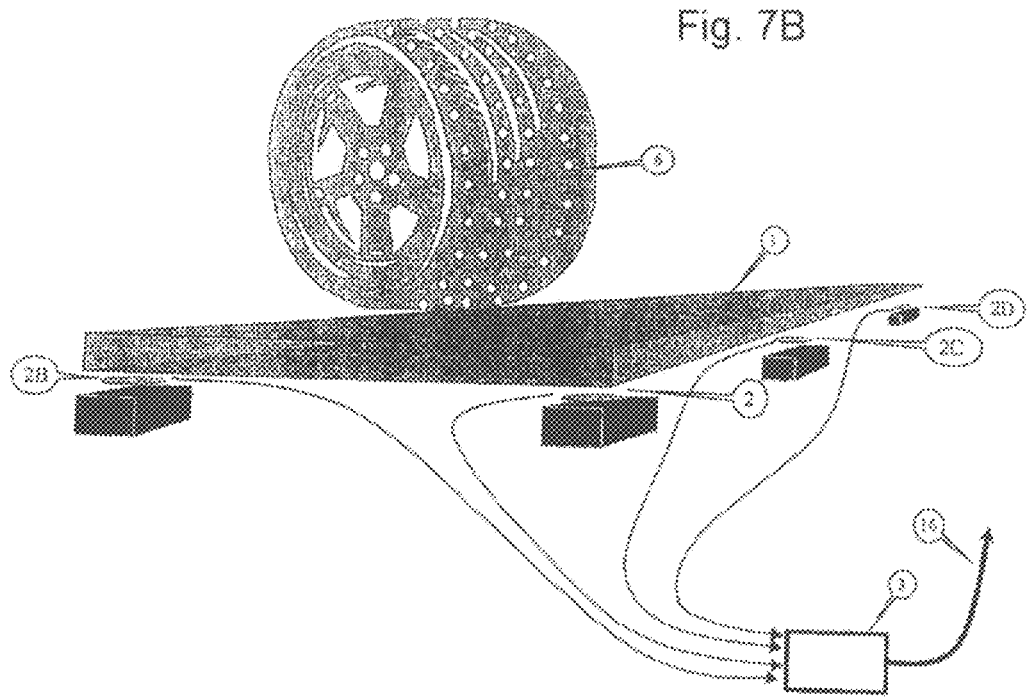
FIG. 7B shows a solution corresponding to the solution shown in FIG. 7, but where the sensors 1, 2B-2D are positioned on top of a support for the detection device.

FIG. 7B shows a solution corresponding to the one shown in FIG. 7, but where the sensors 1, 2B-2D are positioned on the top of the supports for the detecting device. As indicated each of the sensors 2, 2B-2D send signals to a processing device that is processing the signals prior to sending such signals for further processing. For this solution microphones do not necessarily be used as sensors.

Figure 8:
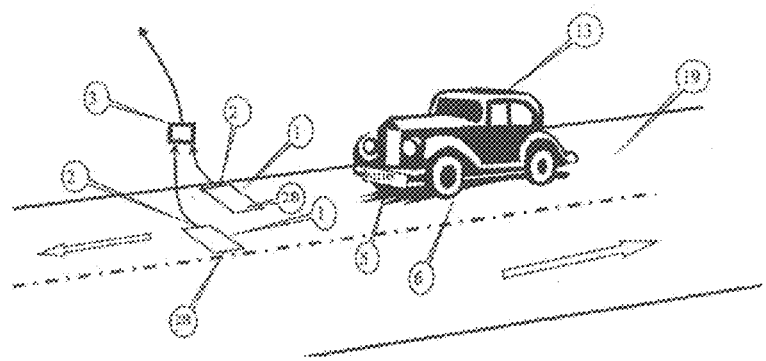
FIG. 8 shows schematically a way of positioning a studded deck sensor, enabling detection of one single deck at the time.
Figure 9:
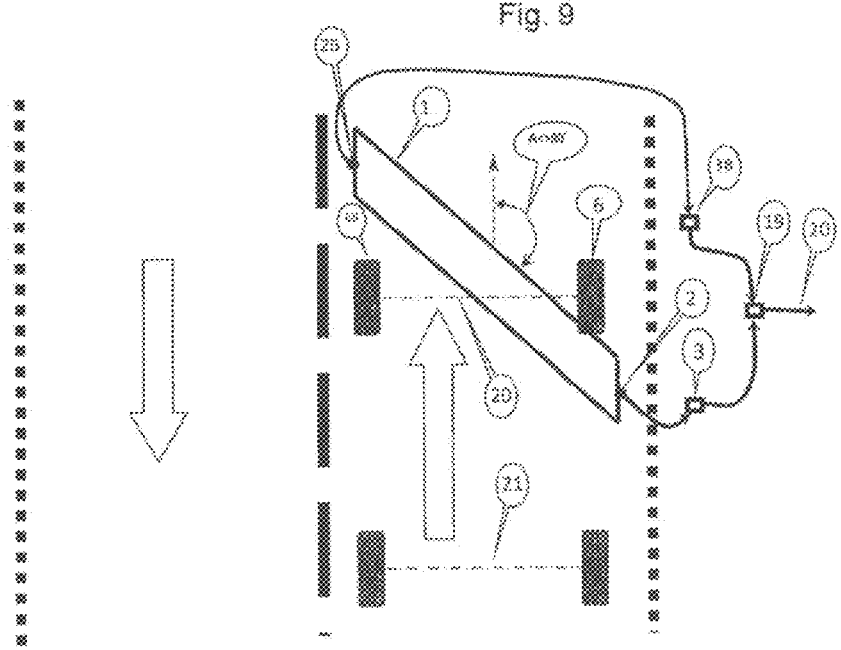
FIG. 9 shows schematically seen from above an arrangement that makes it possible to detect whether one or more of the wheels on a vehicle are equipped with studded tires and possibly also identifying which of said wheels having studs.

FIG. 8 shows a way of positioning of a detector plate 1, making it possible for detection of a single deck 6 at the time. The advantage by detecting one deck 6 at the time makes the detection more reliable, since the detection will not be disturbed by other decks 6. Moreover, this way of positioning provides the possibility of charging fee or toll for the number studded decks rather that a toll for the entire vehicle 19, which is in line with the intention that the one that pollutes is the one to pay for the produced pollution. This is achieved by placing the detector plate with its longitudinal axis in the road surface 18 at an angle A which is different from 90 degrees with respect to the general direction of the road. The angle A of the detector plate 1 must be configured in such way that the one deck on one shaft 20 of the vehicle 19 has already passed over the plate when the deck 6B on the same shaft 20 on opposite side of the vehicle enters the detector plate 1. Such configuration and such case are schematically shown in FIG. 9. Also for this embodiment the plate 1 is connected to one or more sensors 2 for registering the high frequency waves and amplitudes which the decks 6 create when passing over the plate 1. By providing the detector plate 1 with more than one sensor, the sound impulse that comes from to and which is registered by sensor 2 and sensor 2B, offset in time. This feature may be used for determining the width of the vehicle axes, and the velocity and distance between the wheels 15. These parameters may be registered and used whether the vehicle has wheel with studs or not. As shown two detector means 1 are here used which are offset with respect to each other in the direction of motion of the vehicle.

FIG. 10 shows an arrangement making it possible to detect whether the vehicle 19 is equipped with studded decks 6 or not. In addition it is possible to measure the distance between the axes, the velocity and width of the axes of the vehicle 19.

This is achieved by installing two acoustic sensors 2 and 2B on each side of the detector plate 1, since the detector plate 1 is configured such that only one wheel 6 passes over the plate 1 at the time. Hence, the time difference between the signals registered by the sensor 2 with respect to sensor 2B will make it possible to electronically calculate the distance between the shafts and the velocity, in addition to whether the vehicle 19 is equipped with studded decks 6 or not. The sensor 2B is technically equal the sensor 2 and the processing unit 3*b* is technically equal to the processing unit 3. Based on the time difference of the two signals, i.e. the signal from the processing unit 3 and the signal from the processing unit 3B, the unit 23 calculates and transmits these signals further out for processing 20, based from the desired parameters.

Moreover, FIG. 10 shows a method for damping acoustic reflections inside the detector plate 1. A method for dampening the acoustic reflections resides in designing the peripheral edges of the detector plate 1 as skewed surfaces with an angle B shown in the section A-A in FIG. 11. The result is that the acoustic signal 21, that propagates through the plate 1 and which is not directed towards the sensor 2 and/or 2B, are reflected out of the plate and is dampened or receives a frequency which does not disturb the direct and desired acoustic signal.

Internal acoustic reflections 21 disturb the acoustic signal or sound picture that the decks and the studs generate. The acoustic reflection 21 may cause erroneous measurements or erroneous registrations.

A method to for dampening the acoustic reflections is to skew the peripheral edges of the detector plate 1 at an angle B, shown in section A-A. This causes the acoustic signals 21, which are not directed towards the sensor 2 and 2B, to be reflected out of the plate or receives a frequency that does not disturb the direct and desired signal 22.

Since it has been shown that snow and ice cover has a great impact on the sound picture from deck measurements, it is a need for having a snow melting system integrated in the detector device 1. This may for example be achieved by equipping the metal plate with heating cables or similar ways for melting possible snow and/or ice layer on the metal plate.

Figure 12:
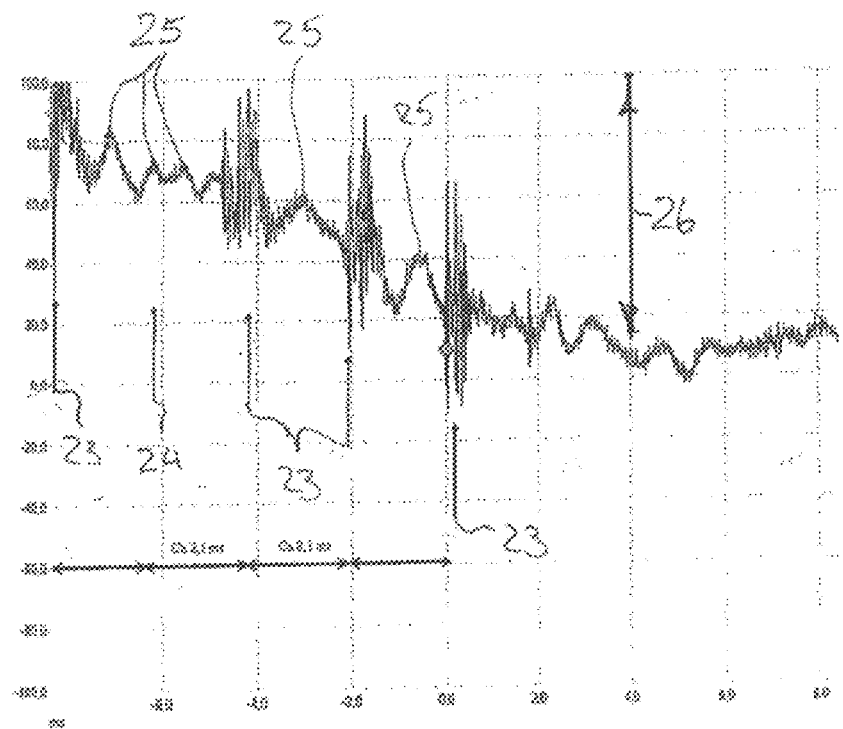
FIG. 12 shows a graph presenting raw data from measurements with respect to a studded deck, where the detector means according to the present invention is used.

FIG. 12 shows a graph that presents raw data for a deck with studs that has passed over a skewed detector device according to the invention. This horizontal axis shows time elapsed in milliseconds, while the vertical axis shows the signal level. As shown a number of peaks, i.e. areas where the amplitude is substantially larger than the adjacent areas, are shown in the graph. Likewise, the arrow 24 shows the absence of a stud. From the graph in FIG. 13, it is moreover possible to establish that the distance between each stud is 9 mm, which distance is calculated based on the time elapsed of about 2.1 ms between the presence of two studs. Moreover, it is the studs (and the distance) laterally on the deck that is shown.

From FIG. 12 it is moreover shown that also the curves between the peaks giving the top points for the studs 23 form waves 25. This variation shows the deck pattern, where the peaks in the intermediate parts between peaks 24 indicates the surface that is in contact with the road surface, while the valleys indicates the bottom of the deck grooves. The smaller distance between said tops and valleys, the poorer is the deck condition.

Figure 13:
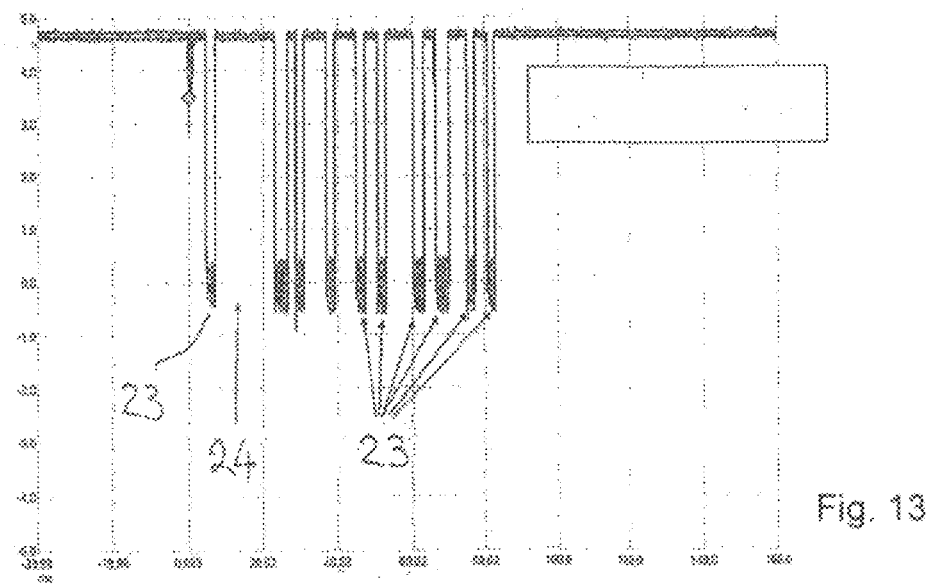
FIG. 13 shows the same data as shown in FIG. 12, where the data is filtered.

The weight of the vehicle may be estimated based on the difference in the average deflection for the first contact between the deck and the detector plate, ref. extreme left on the graph and the average of the deflection at the point in time when the deck leaves the detector plate, such this appear on opposite side, i.e. at extreme right on the graph, where the curves are flatten out. This difference in deflection is indicated with the reference number 26 in FIG. 12. FIG. 13 shows the same data as shown in FIG. 12, where the signals shown in FIG. 12 are processed in a broadband filter and frequency detector. Also here the positions of the stud appear distinctly, likewise that a stud is missing, ref. the arrow 24.

Figure 14:
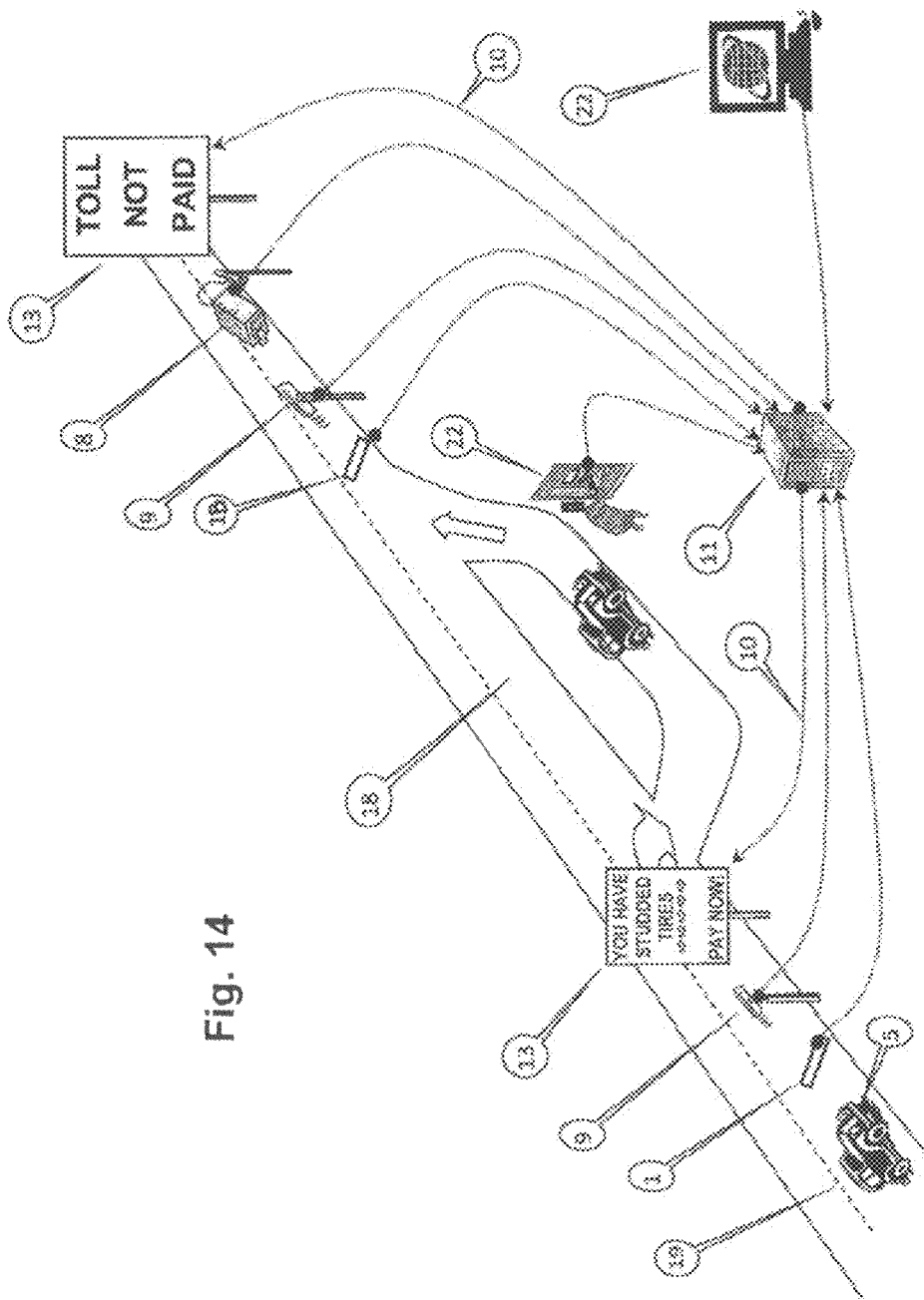
FIG. 14 shows a system for detection and collection with the possibility for payment of relevant toll.

FIG. 14 shows a system for detecting with the possibility of payment of relevant fee and/or toll. According to this embodiment it is established a side lane with a ramp for exit from the road and a ramp for entry to the road. When a vehicle is passing over a detector 1 according to the present invention, those of said previously mentioned parameters that are of interest to monitor or control are registered. According to the embodiment shown, it is studded decks that are to be detected and to be charged for. Moreover, the number plate of the vehicle is photographed by means of a video camera 9. This may be checked up against a central car owner register and/or a payment account. Information or signals from the detection device 1 and from the video camera 9 is communicated to a processor that is processing the signals. If the processor identifies studded decks, a signal 10 is sent to an electronic board 12 where the driver of the vehicle 5 is informed about this, so that the driver of the vehicle may drive into the side lane and pay the required toll. Alternatively, such information may be communicated to a central unit which sends out invoice for the fee at a later stage. If the driver has made a pre-payment, this is registered and the driver will not receive any message that the toll has to be paid, but a confirmation that the toll has been deducted from the pre-paid amount.

When the driver has paid, this will also be registered. If the vehicle passes over the detector device 1B, which is positioned down the road of the exit form the side lane without having paid in the payment automated machine 22, the driver is given a visual massage about this fact from an electronic board 13 further down the road. Picture of the number plate of vehicle 19 may, if required be made by a camera positioned at the end of the entry ramp, back on to the road. Correspondingly, an information device 13 may give information whether payment has been registered or not.

The detector according to the present invention may possibly be formed as several detector plates 1 on the same road surface. This will in such case be an alternative for having a long plate 1 which is skewed with respect to the direction of motion. Each deck will also then be individually detected. By installing the plates in an offset pattern it is then also possible to detect and register the velocity of the vehicle in the same manner as for one plate that are positioned in a skewed manner. The detector will in such case be more easy to install.

The detector(s) may also detect the weight of the vehicle in that the sensor(s) used for registering the sound picture from decks passing over the plate, also register the pressure exerted by the deck onto the plate. Alternatively the weight may be registered and detected by means of own, specially adapted weight sensors which are connected to the detector plate 1. This registration and detection may be executed independent of whether the vehicle is equipped with sensors or not.

It should be noted that the sensor plate, and in any case, the sensors may preferably be provided with a cavity below the plate, since tests have shown that the generated sound can be too much dampened with too large embedment in the road surface or on the lower side of the plate. With such cavity protects, the sensors are protected from displacement in the road surface, and at the same time the cavity can also give a sound amplified effect.

It should also be appreciated that the measurements made have shown that studded tires in particular, but also ordinary tires without studs, for use during the summer season or during the winter season, produce sound with frequencies lying over the audible frequency specter of human beings. In particular, but not exclusively is the frequency band of 20 kHz (±5 kHz) in particular selectively suited for differentiating studded tires from tires without studs and/or for giving a picture of weight, and/or for identifying the deck conditions and suitability for the road conditions. The differences measured in all the twenty tests performed have all been above 13 dbu.

Moreover, it should be appreciated that the detected, registered and processed data related to the deck conditions may be linked up with an information board giving the driver of the vehicle a message that the decks on the vehicle will not be suitable or safe journey during the prevailing road and weather conditions, such as the presence of reduced friction on the road surface, etc.

The invention claimed is:

1. A method for registering one or more of velocity, weight and tire status of tires of a vehicle, where one or more detection devices are arranged on the road surface, the one or more detection devices comprise one or more sensors that are associated with a plate formed from a material suitable for propagating acoustic waves, said plate arranged on the road surface in order to register the one or more of the velocity, weight and the tire status of a vehicle, the detection device is configured to register one or more of high frequency and ultrasonic waves in real time, said waves establish the basis for signals to be processed in a processor, where the velocity and weight of the vehicle may be established and where the condition and status of the tires are established, based on the use of the high frequency or ultrasonic waves caused by the passage of the tires over the detection device(s).

2. The method according to claim 1, wherein said one or more sensors is configured to operate in the frequency band of 20 kHz±5 kHz.

3. A method for registering use of studded tires and for collecting the toll for use of studded tires on a vehicle equipped with at least one studded tire passing over a detection device on a road surface, wherein the detection device comprises a metal plate which is integrated in the road surface, the metal plate being used for detecting use of studded tires by sensors which sense the impulses and produce real time signals for further processing, the detection device being associated with one or more sensors, the method comprising detecting high frequency acoustic impulses produced by tires on the vehicle when the tires pass over the detection device; registering the signals and comparing them with predefined values; determining, by use of a processing device whether one or more of the tires are studded tires; producing by the processing unit a signal if one or more of the tires are studded tires; wherein the signal provides an indication for collecting a toll.

4. A method according to claim 3, further comprising obtaining identification of the owner of the vehicle by means of one or more of video filming, electronic radio tag and by photo of the number plate of the vehicle and comparing such information with a central vehicle register.

5. The method according to claim 3, wherein the processed information is used for issuing invoices to the owner of the vehicle for use of studded tires.

6. The method according to claim 3, wherein the processed information is sent in real time to a device which visually informs the driver of the vehicle about the necessity of paying toll or the fee due.

7. The method according to claim 3, wherein the detection device is configured such that it will be possible to identify which of the tires is equipped with studs.

8. A system for registering of a vehicle, one or more of velocity, weight and tire conditions and status, for one or more of collecting a toll for the vehicle to send a signal that the vehicle must halt from further passage, the system comprising one or more detection devices associated with a plate formed from a material suitable for propagating acoustic waves, said plate disposed on a road surface, one or more sensors arranged in association with each of the one or more detector devices for detecting impulses created by one or more vehicle tires passing over the detection device, a processing unit that indicates one or more of the weight, velocity, condition and status of the tires in real time.

9. The system according to claim 8, wherein said one or more sensors are configured to operate in the frequency band of 20 kHz±5 kHz.

10. A system for registering use of studded tires and for collecting toll for use of studded tires on a vehicle, equipped with at least one studded tire, wherein a detection device is arranged in association with a road, one or more sensors are arranged in association with the detection device for detecting acoustic impulses created by one or more tires on a vehicle that passes over the detection device, and a processing device that compares the impulses with a predefined profile for impulses from studded tires and one or more devices for visualizing whether studded tires are present or not, wherein the detection device forms an integrated unit with the material forming the road surface, said integrated unit preferably being made of at least one plate of a durable metal, such as steel, and having good properties for propagating said impulses.

11. The system according to claim 10, wherein the detection device comprises a body, where the body is configured such that it produces high frequency waves propagating through the material created by the studs on a vehicle, and where the high frequency waves is registered by said one or more sensors.

12. The system according to claim 10, wherein said detection device extends across the road surface of a road.

13. The system according to claim 12, wherein said detection device forms an angle with the longitudinal direction of the road surface of the road, which is different from 90 degrees.

14. The system according to claim 10, wherein the system comprises one or more depicting devices for depicting the vehicle when passing over the detection device.

15. The system according to claim 10, wherein the system also comprises a device that identifies the number plate of the vehicle via one or more of a reading unit and a camera that receives information from the processing device when the vehicle that is equipped with studded tires is passing over the detection device, and a device that issues invoices to the owner of the vehicle when the criteria for studded tires are satisfied.

16. The system according to claim 10, wherein the system comprises a device that shows the driver of a vehicle that the toll for use of studded tires must be paid.

17. A method for registering use of studded tires and for collecting the toll for use of studded tires on a vehicle equipped with at least one studded tire passing over a detection device on a road surface, the detection device being associated with one or more sensors, the method comprising detecting high frequency acoustic impulses produced by tires on the vehicle when the tires pass over the detection device; registering the signals and comparing them with predefined values; determining, by use of a processing device whether one or more of the tires are studded tires; producing by the processing unit a signal if one or more of the tires are studded tires; wherein the signal provides an indication for collecting a toll and the detection device is configured such that it will be possible to identify which of the tires is equipped with studs.

* * * * *